Figure 1:
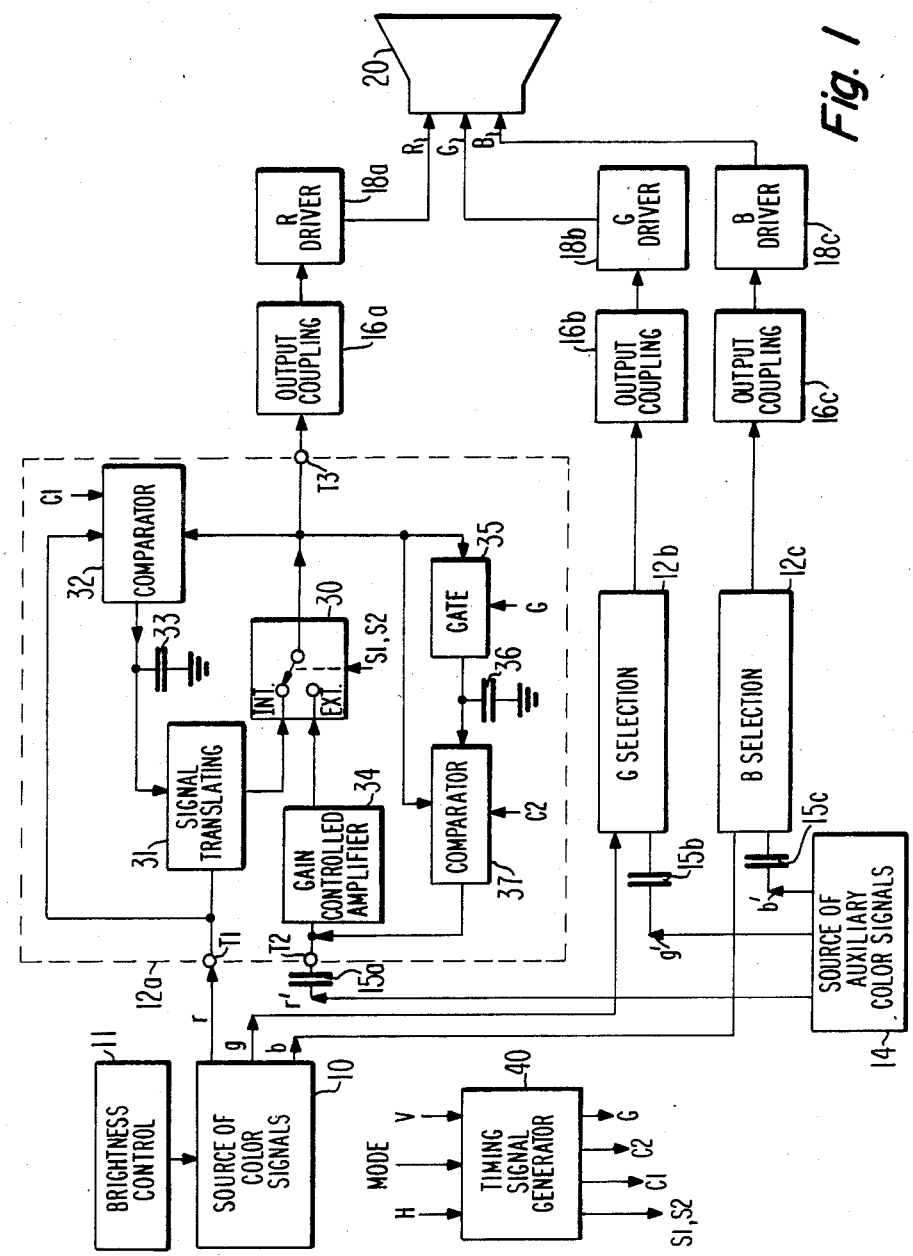

United States Patent [19]

Harwood et al.

[11] Patent Number: 4,660,085
[45] Date of Patent: Apr. 21, 1987

[54] TELEVISION RECEIVER RESPONSIVE TO PLURAL VIDEO SIGNALS

[75] Inventors: Leopold A. Harwood, Somerset County, N.J.; Paul D. Filliman; Ronald T. Keen, both of Marion County, Ind.

[73] Assignee: RCA Corporation, Princeton, N.J.

[21] Appl. No.: 780,015

[22] Filed: Sep. 25, 1985

[51] Int. Cl.$^4$ ............................................. H04N 5/16
[52] U.S. Cl. .................................. 358/171; 358/172; 358/181
[58] Field of Search ............... 358/168, 171, 172, 174, 358/176, 178, 181

[56] References Cited

U.S. PATENT DOCUMENTS 4,301,474 11/1981 Jurgensen ........................... 358/171
4,414,572 11/1983 Flory .................................. 358/172

OTHER PUBLICATIONS

Technical specification pages for the Mitsubishi M51322P RGB, Interface Integrated Circuit.

*Primary Examiner*—Tommy P. Chin
*Attorney, Agent, or Firm*—P. J. Rasmussen; P. M. Emanuel; R. H. Kurdyla

[57] ABSTRACT

A television receiver is arranged to selectively display either information from a broadcast television signal, or information from an auxiliary video signal. The black image reference level associated with the broadcast signal information is sampled and used to automatically establish the black image reference level of the auxiliary video signal.

13 Claims, 2 Drawing Figures

TELEVISION RECEIVER RESPONSIVE TO PLURAL VIDEO SIGNALS

This invention concerns a television receiver capable of displaying both video information derived from a received broadcast television signal, as well as video information associated with an auxiliary video signal. In particular, this invention concerns apparatus for establishing substantially the same black image representative reference level for both broadcast television signal image information and auxiliary video signal image information.

Many television receiver systems are capable of displaying auxiliary video information including alphanumeric character information such as Teletext information and information such as may be provided by a computer terminal. In another type of video information display format scenes from broadcast television signal information are displayed on a major portion of the television display screen, while a smaller portion of the display screen simultaneously displays another scene derived from an auxiliary video source.

In such systems it is desirable to maintain substantially the same image black reference level, i.e., a brightness reference level, for displayed video information derived from all video input sources so that disturbing changes in image brightness are not perceived as between one video input source and another. For video information contained in a conventional television signal in accordance with NTSC standards in the United States, for example, the brightness of a displayed image is related to a black reference level which occurs during a so-called "back porch" interval within each horizontal blanking interval of the television signal. Shifting the black reference level, such as in response to the setting of a viewer adjustable brightness control, changes the DC level of the video signal and thereby results in a change in the brightness of a displayed image.

In accordance with the present invention there is disclosed herein apparatus in a video signal processing and display system such as a television receiver for providing a displayed image with substantially the same black reference level for image information derived from a normal broadcast television signal or from an auxiliary video signal. In the disclosed apparatus a signal selection network selectively couples the outputs of one of two sources of video signals to an image display device. The first of the two signals is a normal broadcast television signal, and the second signal is an auxiliary video signal. In accordance with the principles of the invention, the black reference level associated with the output of the first signal source is used to establish the black reference level of the second video signal.

In accordance with a feature of the invention, the first video signal is DC coupled to the selection network, and a viewer adjustable brightness control circuit is associated with the signal source which supplies the first video signal to the selection network.

Figure 2:
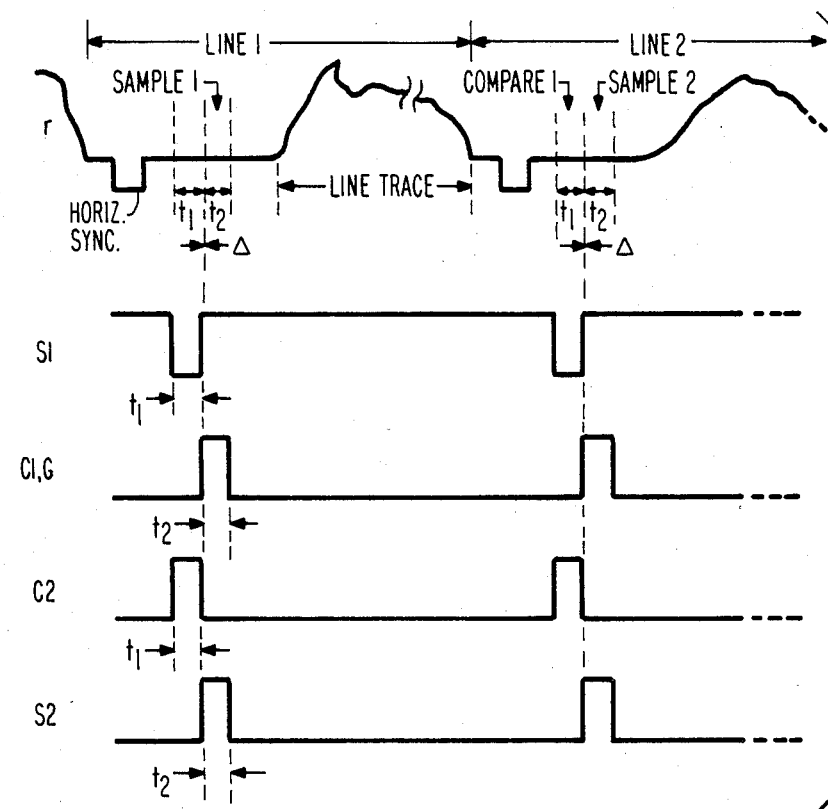

In the drawing:

FIG. 1 shows a portion of a color television receiver including a signal selection network according to the present invention including provision for establishing the black reference levels of video signals selectively coupled thereby; and FIG. 2 illustrates waveforms helpful in understanding the operation of the selection network in FIG. 1.

In FIG. 1, low level color image representative signals r, g and b from a source 10 are supplied to respective first input terminals (e.g., T1) of red (R), green (G) and blue (B) video signal selection networks 12a, 12b and 12c. Auxiliary color image representative signals r', g' and b' from an auxiliary color signal source 14 are AC coupled via DC blocking capacitors 15a, 15b and 15g to respective second input terminals (e.g., T2) of selection networks 12a, 12b and 12c. Output signals from the selection networks are respectively coupled via output coupling networks 16a, 16b and 16c to red, green and blue display driver stages 18a, 18b and 18c which provide high level amplified color signals R, G and B to respective intensity control electrodes (e.g., cathode electrodes) of an image displaying kinescope 20. Output coupling networks 16a, 16b and 16c include horizontal and vertical image blanking circuits and buffer circuits, for example. Since selection networks 12a, 12b and 12c are identical in structure and operation, only the operation of selection network 12a will be described in detail.

Color signals r, g and b from source 10 are derived from a received broadcast television signal and are considered to be "internal" signals for the purpose of the following discussion. Color signals r', g' and b' from source 14 are considered to be "external" signals. Both the internal and external signals include image synchronizing components which are provided to synchronizing circuits of the receiver for synchronizing the horizontal and vertical scanning of a displayed image. The latter function can be accomplished by means of a video signal switching network such as the TA 7348P integrated circuit commercially available from Toshiba Corporation of Kawasaki, Japan. This switching network includes a manually or automatically activated electronic switch which selectively couples either detected video information (including synchronizing components) from a broadcast television signal to video and synchronizing signal processing circuits of the receiver in an internal signal display mode, or the synchronizing components of an external auxiliary video signal source to synchronizing signal processing circuits of the receiver in an external signal display mode.

Selection network 12a includes an electronic switch 30 with an "internal" position (INT) and an "external" position (EXT), and responds to alternative control signals S1 and S2 as will be discussed in connection with FIG. 2. Output signals from switch 30 appear at output terminal T3. A black reference DC voltage appears at the r, g and b color television signal outputs of source 10 during back porch intervals when a television signal modulated with image information is present. The black reference voltage also appears during intervals corresponding to back porch intervals when image information modulation is absent. Thus source 10 does not include horizontal and vertical blanking circuits which typically produce a blacker-than-black condition during image blanking intervals. In the disclosed system such blanking circuits are included in output coupling networks 16a, 16b and 16c. The black reference DC voltage at the outputs of source 10 varies with the setting of a viewer adjustable brightness control network 11 associated with source 10, which also includes an image contrast control for adjusting the peak-to-peak amplitude of color signals r, g and b.

Switch 30 occupies the INT position when "internal" r color signal information from source 10 is to be displayed. In such case the r signal is conveyed via a DC coupled video signal path from the output of source 10 including input terminal T1, a signal translating network 31 (e.g., including level shifting and buffer circuits), switch 30, and output terminal T3, to red signal output coupling network 16a and kinescope driver 18a.

A keyed comparator 32 responsive to a keying signal C1 operates during the back-porch interval of each horizontal line blanking interval, and compares the black reference voltage at the output of switch 30 with the black reference voltage at input terminal T1. As a result of this comparision, an error voltage representative of the black level difference at the inputs of comparator 32 is developed across a storage capacitor 33. The error voltage is applied to a control input of translating network 31 to alter the DC condition of the internal video signal path so that substantially equal black reference voltages appear at the inputs of comparator 32. By this feedback control action the black reference level at output terminal T3 is compensated for any unwanted DC offsets associated with switch 30 and the circuits constituting signal translating network 31.

Switch 30 occupies the EXT position when external r' color signal information from source 14 is to be displayed. In such case signal r' is conveyed via an AC coupled signal path including DC blocking capacitor 15a, input terminal T2, a gain controlled amplifier 34, switch 30, and output terminal T3 to red signal output coupling network 16a. Network 34 includes a variable gain amplifier responsive to a viewer adjustable contrast control (not shown) which is common to amplifier 34 and similar networks in selection networks 12b and 12c, for adjusting the peak-to-peak amplitude of signal r' independent of the contrast setting established for the internal signals from source 10. Amplifier 34 may also include level shifting and buffer circuits as in network 31.

The black level and hence the brightness of the displayed image for signals from source 14 in the external mode is established by means of a network including a keyed gate 35 responsive to a gating signal G, a storage capacitor 36 and a keyed comparator 37 responsive to a keying signal C2 developed during the video signal back porch black reference interval. A DC control voltage output from comparator 37 is coupled to the external signal path at input terminal T2. Comparator 37 cooperates with input AC coupling capacitor 15a to form a black level feedback clamp to establish a desired DC level for the external signal path.

The brightness representative DC level for the external signal path is directly related to the brightness representative black reference level of the output from internal source 10, as will seen from the following discussion of the operation of selection network 12a with regard to the waveforms for timing signals S1, S2, C1, C2 and G shown in FIG. 2.

The first waveform shown in FIG. 2 depicts a portion (two horizontal line intervals) of red video signal r from source 10. The auxiliary video signal from source 14 exhibits the same format. Each horizontal line includes a negative-going horizontal synchronizing (sync) pulse interval, followed by a so-called back-porch black reference interval including time intervals $t_1$ and $t_2$ situated between the end of the horizontal sync pulse interval and the beginning of the horizontal line trace interval. Time intervals $t_1$ and $t_2$ are approximately 3.5 microseconds and 1.5 microseconds in duration, respectively, separated by a time interval W of approximately 50 nanoseconds.

Switch 30 is placed in the upper, internal (INT) signal position whenever that one of alternative switching signals S1 or S2 which is coupled to switch 30 exhibits a positive level. Switch 30 is placed in the lower, external (EXT) position whenever that one of switching signals S1 or S2 which is coupled to switch 30 exhibits a less positive level. Timing signal S1, which alternatively keys switch 30 with signal S2 as will be discussed, exhibits a less positive level during time $t_1$ of each horizontal line. Therefore if signal S1 has been selected to be coupled to switch 30, switch 30 occupies the EXT position during time $t_1$ of each horizontal line. Timing signal S2 exhibits a positive level during time $t_2$ of each horizontal line. Therefore if signal S2 has been selected to be coupled to switch 30, switch 30 occupies the INT position during time $t_2$ of each horizontal line. Timing signals C1 and G exhibit a positive level during time $t_2$, and timing signal C2 exhibits a positive level during time $t_1$. Comparators 32 and 37 are enabled to operate during times $t_2$ and $t_1$ of each line, respectively, in response to the positive components of timing signals C1 and C2. Gate 35 is enabled to conduct in response to the positive component of timing signal G during time $t_2$ of each horizontal line.

The position of switch 30 during horizontal line trace intervals is determined by the sense (i.e., polarity) of switch control signals S1 and S2 during trace intervals. When a given horizontal line trace interval contains only internal signal information signal S1 controls the position of switch 30. When a given trace interval contains only external signal information signal S2 controls the position of switch 30.

However, during line trace intervals switch 30 can occupy either the INT or EXT position depending on the instructions received by switch 30 from signals S1 or S2 during the trace intervals. For example, assume that the receiver is in the "internal" display mode wherein switch 30 is controlled by signal S1, except that at certain times the receiver is intended to display auxiliary information, such as the time of day or the number of the channel to which the receiver is tuned, for example, on a small portion of the display screen either automatically or in response to an instruction from the viewer. Auxiliary display functions such as these are sometimes provided in conventional television receivers, which include a microprocessor controlled character generator responsive to control signals for enabling the display of the auxiliary information. Such control signals can be applied to the MODE control signal input of a timing signal generator 40 for temporarily causing the S2 signal to be applied to switch 30 when the auxiliary external information is to be displayed during a given portion of the horizontal trace interval of the internal video signal.

Signals S1, S2, C1, C2 and G are generated by timing signal generator 40 which responds to horizontal and vertical image synchronizing signals H and V developed by deflection synchronizing circuits of the receiver. Signal generator 40 may include, for example, signal delay circuits (such as monostable multivibrators) or sequential logic circuits (such as counters) responsive to the horizontal sync pulses for generating signals C1, C2 and G. Signals S1 and S2 are respectively derived from signals C2 and C1.

Timing generator 40 also responds to a MODE control signal which determines which one of signal S1 and S2 is provided at a mode control output of generator 40. The MODE control signal may be developed either automatically by circuits within the receiver, or manually by a viewer when switching between an internal broadcast television image display mode and an external image display mode. For example, the display of (external) alphanumeric Teletext information on a portion of the display screen may proceed automatically by the MODE control signal enabling switch 30 to switch between the internal and external positions as required to display the Teletext information on a portion of the display screen which otherwise would display a broadcast television image. Alternatively, the Teletext information display can be enabled in response to the setting of a viewer controlled manual switch.

Timing generator 40 contains logic circuits such as including a logic gate responsive to signals S1 and S2, and to the MODE control signal to determine which one of signals S1 and S2 is conveyed from the (S1, S2) output of timing generator 40. Thus either signal S1 or signal S2 will be selectively conveyed from the output of timing generator 40 when the MODE control signal corresponds to either an internal or an external display mode, respectively.

With the dual image display capability of the disclosed receiver, it is desirable to maintain substantially the same black level for images displayed in both the internal and external modes. Otherwise, disturbing changes in image brightness can result as between the display of internal broadcast television signal information and external signal information. The likelihood of such brightness changes occurring is substantially eliminated by disclosed selection networks 12a-12c, which automatically maintain substantially the same image black reference level for both internal and external image display modes, as will now be explained.

In the internal display mode when broadcast television information provided by signal r from source 10 is to be displayed, timing generator 40 produces signal S1 at its mode control output. Signal S1 causes switch 30 to be placed in the INT position during times including the line trace interval for conveying television image information to kinescope 20. During time $t_1$, however, signal S1 causes switch 30 to be placed in the EXT position whereby the output of source 10 is decoupled from the kinescope.

During time $t_2$ of one horizontal line (LINE 1) when the black reference level of the television signal is present, signal C1 renders comparator 32 operative to compare the black reference level at the output of switch 30 with the black reference level at input terminal T1, to develop an output control signal across capacitor 33 for establishing a desired black reference voltage at output terminal T3 of network 12a by feedback control action. Comparison occurs at time $t_2$ rather than during earlier time interval $t_1$ during the same back porch interval, to reduce the chance that the comparison will be disturbed by effects associated with the horizontal sync pulse during its settling time. At the same time, signal G enables gate 35 to conduct and convey the black reference voltage, which is established at output terminal T3 by the action of comparator 32, to storage capacitor 36.

Capacitor 36 stores the established black reference voltage until the next horizontal line (LINE 2) when, during time $t_1$ of such next line, signal C2 enables comparator 37 to compare the stored black reference voltage with a black reference level appearing at terminal T3 during time $t_1$ of LINE 2. An output control voltage from comparator 37 assists to establish a correct black reference level for use in the external signal display mode, as will be discussed shortly. The output control voltage from comparator 37 is advantageously directly related to the black reference level established at output terminal T3 in accordance with the output from internal signal source 10. In this way the black level representative output control voltage from comparator 37 is continually updated on a line-by-line basis to assure that time delays are avoided in establishing and maintaining uniform image brightness for both internal and external displayed image information, when switching between internal and external receiver display modes.

The timing of signals C1, C2 and G with respect to the operation of comparators 32 and 37 and gate 35 remains the same for both internal and external operating modes of the receiver.

In the external operating mode when external auxiliary signal r' from source 14 is to be displayed, timing generator 40 produces signal S2 at its mode control output. Signal S2 causes switch 30 to be placed in the EXT position during times including line trace intervals for conveying auxiliary video signal information to kinescope 20. During black level reference time $t_2$, however, signal S2 causes switch 30 to be placed in the INT position whereby the black reference level associated with the output of internal signal source 10 is conveyed via switch 30.

As explained previously, such black reference level is processed by comparator 32 and capacitor 33 to establish a desired black reference level at output terminal T3. At the same time, the established desired black reference level is conducted by gate 35 in response to signal G, and stored by capacitor 36. During the next horizontal line (LINE 2), comparator 37 is enabled by signal C2. Comparator 37 then compares the stored voltage on capacitor 36 (representative of the previously established internal signal black reference level) with the black reference level of the external signal, which appears during time $t_1$ of LINE 2 and is conducted via switch 30 to a signal input of comparator 37.

The output control voltage of comparator 37 is representative of the difference between the black reference level of the external auxiliary signal and the desired black reference level as established in accordance with the black level output of internal signal source 10. This output control voltage is stored by input AC coupling capacitor 15a, which constitutes an element of a feedback clamp for establishing a desired black reference level for external signals to be displayed. By feedback action the control loop including switch 30, gate 35, comparator 37 and capacitors 36 and 15a reduce the difference between the black reference level of the external signal and the black reference level associated with the output of internal signal source 10 so that both external and internal signal information to be displayed exhibit substantially eqaul black reference levels.

What is claimed is:

1. A video signal processing system including an image display device, said system comprising:
   switching means having a first input for receiving a first video signal having image information occurring during periodic image intervals and a black reference component occurring during periodic blanking intervals, a second input for receiving an auxiliary second video signal having image information occurring during periodic image intervals and a black reference component occurring during periodic blanking intervals, a control input, and an output coupled to said display device;

timing means coupled to said control input of said switching means for causing said switching means to exhibit a first position for coupling said first input of said switching means to said display device via a first signal path in a first operating mode, and to exhibit a second position for coupling said second input of said switching means to said display device via a second signal path in a second operating mode;

means for providing said first video signal with a desired black reference level; and control means, responsive to said first video signal provided with said desired black reference level, having an output coupled to said second signal path for automatically providing said second video signal coupled via said second signal path with a black reference level derived from said first video signal provided with said desired black reference level.

2. A system according to claim 1, wherein a brightness control network for controlling the brightness of a displayed image is associated with a source of said first video signal; and said first video signal is DC coupled to said display device via said switching means.

3. A system according to claim 1, wherein said control means includes a sampling circuit with an input responsive to said first video signal provided with a desired black reference level, and an output coupled to said second signal path.

4. A system according to claim 3 and further comprising a signal comparator with an input for receiving output signals from said sampling circuit, an input for receiving said auxiliary second video signal from said signal path at said output of said switching means, and a control input responsive to a timing signal from said timing means for enabling said comparator to develop an output control signal representative of the difference between said desired black reference level of said first video signal from said sampling circuit and the black reference level of said auxiliary second video signal.

5. A system according to claim 4, wherein said auxiliary second video signal is coupled via a capacitor to said second input of said switching means; and said output control signal is coupled to said coupling capacitor for determining the charge thereof.

6. A system according to claim 2, wherein said providing means includes a first keyed comparator responsive to said first video signal and to a video signal related to said first video signal as appearing at said output of said switching means; said first keyed comparator being rendered operative during a blanking interval portion of a horizontal line containing said black reference component of said first video signal for providing from an output thereof, to said first signal path at said first input of said switching means, a first control signal for maintaining said desired black reference level of said first video signal;

a storage network stores a signal representative of said desired black reference level of said first video signal;

said control means includes a second keyed comparator responsive to said stored signal representative of said desired black reference level of said first video signal, and responsive to said second video signal from said second signal path at said output of said switching means; said second comparator being rendered operative during a blanking interval portion of a horizontal line containing said black reference component of said second video signal for providing at an output thereof a second control signal representative to the difference between said stored signal and said black reference level of said second video signal; and means for coupling said second control signal to said second signal path at said second input of said switching means for maintaining the black reference level of said second video signal in accordance with said desired black reference level established for said first video signal.

7. A system according to claim 6, wherein said first and second comparators respectively operate during successive horizontal blanking intervals.

8. A system according to claim 1, wherein said video signal processing system is a broadcast television receiver; and said first video signal is a broadcast television signal.

9. A television signal processing system including an image display device, said system comprising:

switching means with a first input for receiving a television signal having image information occurring during periodic horizontal image intervals and a black reference component occurring during periodic horizontal blanking intervals, a second input for receiving an auxiliary second video signal having image information occurring during periodic horizontal image intervals and a black reference component occurring during periodic horizontal blanking intervals, a control input, and an output coupled to said display device;

means for providing a first timing signal to said control input of said switching means when said switching means is to exhibit a first position for coupling said first input of said switching means to said display device via a first signal path, and for providing a second timing signal to said control input of said switching means when said switching means is to exhibit a second position for coupling said second input of said switching means to said display device via a second signal path;

means for providing said television signal with a desired black reference level; and control means, responsive to said desired black reference level of said television signal, having an output coupled to said second signal path for automatically providing said auxiliary video signal with a black reference level derived from said desired black reference level of said television signal.

10. A system according to claim 9, wherein in response to said first timing signal said switching means exhibits said first position except during a first portion of said television signal blanking interval containing said black reference component, and exhibits said second position during said first portion; and in response to said second timing signal said switching means exhibits said second position except during a second portion of said auxiliary signal blanking interval containing said black reference component, and exhibits said first position during said second portion.

11. A system according to claim 10, wherein said first blanking interval portion occurs prior in time to said second blanking interval portion within a given horizontal line blanking interval.

12. A system according to claim 10, wherein said providing means comprises a first comparator with an input coupled to said first input of said switching means, an input coupled to said output of said switching means, and an output coupled to said first signal path; said first comparator being rendered operative during said second portion of one horizontal line for providing a first output control signal at said output representative of the difference between the magnitudes of black reference components then appearing at said comparator inputs;

said first output control signal is coupled to said first signal path at said first input of said switching means for maintaining said desired black reference level of said television signal;

a storage network is coupled to said first signal path, said storage network being rendered operative during said second portion of said one horizontal line for storing a signal representative of said desired black reference level of said television signal;

said control means includes a second comparator with an input for receiving said stored representative signal, an input for receiving said auxiliary signal from said second signal path at said output of said switching means, and an output; said second comparator being rendered operative during said first portion of a next horizontal line for providing a second output control signal representative of the difference between said stored representative signal and the black reference conponent of said auxiliary video signal; and means for coupling said second control signal to said second signal path at said second input of said switching means for maintaining the black reference level of said auxiliary video signal in accordance with said desired black reference level established for said television signal.

13. A system accoring to claim 9 and further comprising means for AC coupling said auxiliary second video signal to said second input of said switching means;

means for DC coupling said television signal to said display device via said first input of said switching means; and an image brightness control network coupled to a source of said television signal.

* * * * *